United States Patent [19]

Alferness et al.

[11] 4,376,138
[45] Mar. 8, 1983

[54] OPTICAL WAVEGUIDES IN INGAASP AND INP

[75] Inventors: Rodney C. Alferness; Ivan P. Kaminow, both of Holmdel, N.J.

[73] Assignee: Bell Telephone Laboratories, Incorporated, Murray Hill, N.J.

[21] Appl. No.: 336,598

[22] Filed: Jan. 4, 1982

[51] Int. Cl.³ .................................................. G02B 5/172
[52] U.S. Cl. ........................................ 427/160; 427/85; 427/162; 427/163; 427/164
[58] Field of Search ............... 427/160, 162, 163, 164, 427/85

[56] References Cited

U.S. PATENT DOCUMENTS 4,093,345  6/1978  Logan et al. ..................... 350/355
4,177,298 12/1979  Shigeta et al. ................... 427/85
4,284,663  8/1981  Carruthers et al. ............... 427/164

OTHER PUBLICATIONS

Reinhart et al., "Transmission Properties of Rib Waveguides Formed by Anodization of Epitaxial GaAs on $Al_xGa_{1-x}As$ Layers", Applied Physics Letters, vol. 24, No. 6, Mar. 15, 1974, pp. 270–272.

Campbell et al., "GaAs Electrooptic Directional Coupler Switch", Applied Physics Letters, vol. 27, No. 4, Aug. 15, 1975, pp. 202–205.

Benson et al., "Photoelastic Optical Waveguiding in InP Epitaxial Layers", 7th European Conference on Optical Communication, Sep. 8–11, 1981, pp. 9.4–1 to 9.4–3.

Primary Examiner—James R. Hoffman
Attorney, Agent, or Firm—Eugen E. Pacher; Richard D. Laumann

[57] ABSTRACT

Optical waveguides are formed in semiconductors, for example, InP and InGaAsP, by indiffusion of selected metal atoms.

16 Claims, 4 Drawing Figures

OPTICAL WAVEGUIDES IN INGAASP AND INP

FIELD OF THE INVENTION

This invention pertains to integrated optics, and in particular, it pertains to a method for forming optical strip waveguides in InGaAsP and InP and other semiconductors.

BACKGROUND OF THE INVENTION

Researchers in the field of integrated optics have long sought to develop methods for producing active devices, such as lasers or light-emitting diodes (LEDs), and passive devices, such as waveguides, couplers, switches, modulators, and the like on the same substrate. Because the appropriate active devices can only be manufactured in semiconductor materials, the above-referred to passive devices would therefore also have to be manufactured in or on a semiconductor substrate.

Both active devices and passive components, such as waveguides, have been manufactured in GaAs. However, GaAs lasers or LEDs emit light of a relatively short wavelength which is shorter than the infrared wavelengths currently considered most promising for fiber optical communication. These wavelengths of current interest for optical communication are in the region from about 1 $\mu$m to about 1.6 $\mu$m. In this wavelength regime, InP and InGaAsP LEDs and lasers have been developed. Consequently, attention is being paid to InP and InGaAsP as semiconductor materials for related integrated optics. In particular, work has been done to develop methods for fabricating optical strip waveguides in InP and InGaAsP.

In order to manufacture a strip waveguide, it is necessary to change the refractive index of some volume of material so that the effective refractive index of the material surrounding the waveguiding region is less than the effective refractive index of the waveguiding region. Such a structure can guide electromagnetic radiation of the appropriate wavelength by means of total internal reflection.

Several approaches have been used in the past to create the above referred to difference in the effective refractive indices. In insulators, such as LiNbO$_3$ or LiTaO$_3$, metal in-diffusion is a commonly practiced method. See, for instance, U.S. Pat. No. 4,284,663, issued Aug. 18, 1981 to J. R. Carruthers, I. P. Kaminow, and R. V. Schmidt for "Fabrication of Optical Waveguides by Indiffusion of Metals." The in-diffusion of metal ions, e.g., of Ti, into LiNbO$_3$ or LiTaO$_3$ is carried out at quite high temperatures, typically greater than about 800° C.

InP and InGaAsP sample surfaces typically deteriorate when maintained at elevated temperatures. The deterioration is mainly due to loss of phosphorus from the sample. This loss is considerable at the high temperatures usually thought to be necessary to obtain acceptably short diffusion times, i.e., at temperatures comparable to those used in, e.g., LiNbO$_3$. For this and other reasons it has hitherto been considered impractical to fabricate waveguides in InP and InGaAsP by means of metal indiffusion. Therefore, other approaches to waveguide formation have been used in these and other compound semiconductors.

One of these alternate approaches has been the use of rib waveguides in materials such as GaAs and InP. See, for instance, the article by Reinhart et al entitled "Transmission Properties of Rib Waveguides Formed by Anodization of Epitaxial GaAs on Al$_x$Ga$_{1-x}$As Layers," *pplied Physics Letters*, 24, pp. 270–272, Mar. 15, 1974. Rib waveguides can be formed by appropriately shaping the surface of a planar waveguide. See, for instance, U.S. Pat. No. 4,093,345 issued on June 6, 1978 to Ralph Andre Logan, Franz Karl Reinhart, and William Robert Sinclair. Stress-caused changes in the refractive index have also been used to create strip waveguides in InP. See, for instance, T. H. Benson et al., "Photoelastic Optical Waveguiding in InP Epitaxial Layers," *7th European Conference on Optical Communications*, Sept. 8–11, 1981. Benson et al. defined strip waveguides in InP samples by depositing either a positive or a negative pattern of a thick (approximately 1 $\mu$m) metal film on the substrate. By a positive pattern or mask, we mean herein a metal pattern that directly overlies the region to be transformed into a waveguide, and by a negative pattern or mask, we mean herein a metal pattern that overlies the regions of the substrate bordering the region to be transformed into a waveguide. The metal used by Benson et al typically was gold, and the pattern was typically created by standard photolithographic and etching techniques. A planar waveguiding layer was created by forming an n-type InP epitaxial layer on an n+ InP substrate. Lateral confinement of the radiation was achieved through the strain induced in the epitaxial layer by the thick metal film on cooling after evaporation of the metal.

The presence of a conductive layer, e.g., a metal layer, on a semiconductor surface is known to result in a change of the effective index of refraction of the near-surface semiconductor material. This effect has also been used to define waveguiding structures. See, for instance, "GaAs Electro-Optic Directional Coupler Switch," J. C. Campbell et al., *pplied Physics Letters*, 27, pp. 202–205, Aug. 15, 1975.

Thus, the prior art teaches several methods for manufacturing optical strip waveguides in InP and InGaAsP. However, these methods have drawbacks. For instance, rib waveguides typically have relatively high scattering loss off the edges of the rib. Stress-induced waveguides are in principle easy to manufacture, but in practice are difficult to manufacture reproducibly, and device characteristics are subject to change with time. And metal-loaded waveguides strongly attenuate the transverse magnetic (TM) mode of the electromagnetic radiation, and thus have restricted applicability, in addition to confining the radiation relatively poorly. For these and other reasons, a method for manufacturing optical strip waveguides in InGaAsP and InP, as well as other semiconductors, that is compatible with established processing techniques, is reliable, reproducible, and results in guides capable of guiding both transverse electric (TE) and TM modes with relatively little loss would be of considerable interest.

SUMMARY OF THE INVENTION

We have found that strip waveguides can be manufactured by depositing a patterned processing layer on the sample surface, thereby defining the waveguiding region, maintaining the sample at a temperature between about 400° C. and about 600° C. for at least about an hour, in a controlled atmosphere, such as that in an evacuated sealed ampoule, and contacting the appropriate parts of the sample surface with appropriate metal atoms during the heat treatment to cause a change in the refractive index. In a preferred embodiment, the strip waveguides are for infrared (IR) radiation, e.g., of 1.3 μm wavelength in IR transparent InP or InGaAsP samples. When appropriate precautions are taken, the heat treatment does not result in substantial deterioration of the sample surface. Metals useful in the practice of the inventive method are Si, Ge, Sn, Te, Se, As, P, Sb, Cd, Zn, In, Ga, Al, Fe, Cr, Cu, Ag, and Au, with Ge, Au, Fe, and Cr being preferred metals. Some metals, e.g., Au and Ge, can be deposited on the sample to define the waveguiding regions by means of a negative pattern, i.e., they are deposited on the surface regions adjacent to the intended waveguiding region. Other metals can be deposited on the sample by means of a positive pattern, i.e., they are deposited directly over the intended waveguiding region. When members of the former group of metals are used to manufacture strip waveguides, it is then necessary to first form a planar waveguiding layer by means of formation of an epitaxial layer on the substrate, with the epitaxial layer having a higher refractive index by virtue of, for example, a substantially lower concentration of free carriers or a different composition than the substrate material. When using a member of the latter group of metals to form a waveguide, the formation of a planar guiding layer is typically not necessary.

It is also possible to define the waveguiding regions by means of a nonmetallic processing layer, a mask, and to contact the unmasked sample surface regions at elevated temperature with an atmosphere comprising an appropriate metal compound that yields metal atoms that can diffuse into the unmasked sample regions.

Diffusants that result in deep traps in InP and InGaAsP, e.g., Fe and Cr, can also be used to create high-resistivity regions, which allow formation of electric field dependent passive devices, e.g., electro-optic switches and modulators or semi-insulating semiconductor substrates. In addition, these diffusants can be used to form waveguides in heavily doped substrates by reducing the carrier concentration by means of deep level trapping.

The inventive method is useful for the manufacture of optical devices comprising optical strip waveguides in InP and InGaAsP samples. Such devices typically comprise, in addition to active devices such as light sources, passive devices such as couplers, switches, and modulators, in addition to means for coupling radiation into a waveguide, and means for extracting the radiation from a waveguide.

DETAILED DESCRIPTION

We have found that it is possible to produce strip waveguides for infrared radiation, typically in the wavelength region from about 1 μm to about 1.6 μm, in crystalline InP or InGaAsP by a method comprising a heat treatment at a temperature in the range from about 400° C. to about 600° C., for a time longer than about one hour in a controlled environment, such as that in a sealed ampoule that is evacuated or filled with an inert gas, to result in indiffusion of metal atoms into the semiconductor material to change the semiconductor refractive index whereby waveguiding is produced. Although our invention will be described by specific reference to waveguides produced in InP and InGaAsP, it is to be understood that the method may be used with other semiconductors.

In semiconductors, impurity atoms do not generally make a bound polarizability contribution to that of the matrix, i.e., the presence of impurity atoms as such does not typically result in a change of the refractive index of the intrinsic unit cell. Instead, impurities in semiconductors typically alter the number of free carriers and thereby through this mechanism effect the change in the refractive index. For instance, increasing the number of uncompensated free carriers in a semiconductor material typically results in a negative refractive index change. Changing the number of carriers in an appropriately shaped volume of a semiconductor is thus a possible method for producing a waveguide in a semiconductor sample. Nevertheless, the impurity may in some cases be regarded as alloying with the semiconductor to form a new compound with a different refractive index. In the following discussion, we will assume the free carrier mechanism although the alloying mechanism may be more descriptive in some cases.

Figure 1:
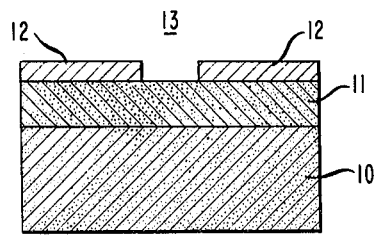
FIG. 1 schematically shows a waveguide region defined by a negative metal patterning layer.

We will now discuss some of the ways in which the inventive method can be practiced. FIG. 1 schematically shows a negative patterning layer defining the intended waveguiding region. On crystalline substrate 10 is grown epitaxial layer 11, typically by liquid phase epitaxy, and on the epitaxial layer is deposited patterning layer 12, typically a metal layer, which defines, through a window in the patterning layer, the intended waveguiding region 13 which is in layer 11 under the window in layer 12. In the embodiment described, the substrate typically consists essentially of monocrystalline InP, typically oriented such that the epitaxial layer is grown on a (100) surface. The epitaxial layer can be InP or InGaAsP. For the practice of the invention, the epitaxial layer 11 typically is between about 0.5 μm and about 3 μm thick, with the thickness selected to yield a guide of the desired optical properties, i.e., capable of forming, in well-known manner, either a single mode or multimode guide for radiation of the intended wavelength. The refractive index of the epitaxial layer is chosen so that it exceeds the refractive index of the substrate. In a variation of the arrangement shown in FIG. 1, a buffer layer is interposed between substrate and epitaxial layer. This buffer layer typically consists of undoped InP, and, for the practice of the invention, typically has a thickness between about 1 μm and about 3 μm.

Figure 2:
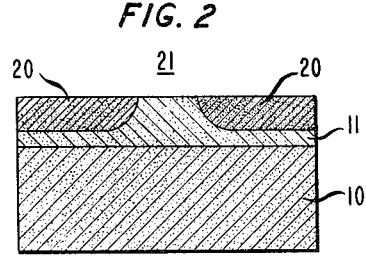
FIG. 2 schematically shows a waveguide formed by means of a negative patterning layer.

Metal patterning layers, such as layer 12 of FIG. 1, yield, during appropriate heat treatment of the sample, metal atoms that enter the epitaxial layer through the interface between the epitaxial layer and the metal layer deposited thereon and diffuse into the epitaxial layer as is indicated in FIG. 2. There it is shown schematically that regions 20 have been altered through diffusion of at least part of the metal of the patterning layer into the regions of the epitaxial layer 11 that were covered by the patterning layer prior to the heat treatment that resulted in the diffusion. An appropriate choice of metal to be used to form the patterning layer can result in a lowering of the refractive index of region 20. In such a case, undisturbed region 21, which is the region of layer 11 intermediate regions 20, is surrounded by material having an index of refraction that is less than that of region 21, and region 21 can thus form a waveguiding region for electromagnetic radiation of the appropriate wavelength.

Figure 3:
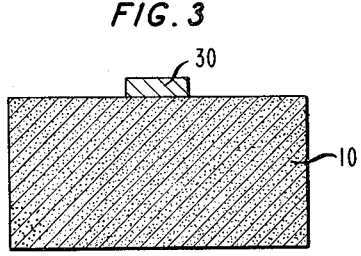
FIG. 3 schematically shows a waveguide region defined by a positive metal patterning layer.
Figure 4:
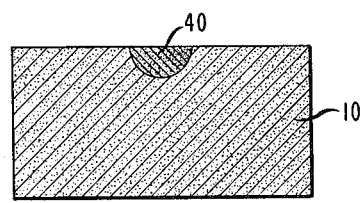
FIG. 4 schematically shows a waveguide formed by means of a positive patterning layer.

FIG. 3 schematically shows the situation in which a positive patterning layer, typically a metal layer, defines the region to be transformed into a waveguide. In the embodiment described, deposited on crystalline substrate 10, typically consisting essentially of InP or InGaAsP, is patterning strip 30. If patterning strip 30 is an appropriate metal, then the appropriate heat treatment results in the device depicted schematically in FIG. 4, where diffusion of metal from the metal patterning strip into the underlying region 40 of substrate 10 has occurred. If the metal has been chosen properly, for example, a p-type diffusant on a strongly n-type substrate then the refractive index of region 40 can be increased over that of the substrate material, resulting in an optical waveguide.

Non-metallic inert complementary patterning layers, e.g., silicon nitride layers, can also be used under the appropriate circumstances. Such a layer or mask, exemplified also by layers 12 of FIG. 1, can be deposited directly onto an appropriate surface of a semiconductor substrate, e.g., the (100) surface of heavily doped n-type InP, and the sample exposed to processing atmosphere comprising a compound of a metal such as Zn. At an elevated temperature, metal atoms, derived from the compound, can contact the exposed substrate surface and diffuse into the substrate. If the treatment results in a higher refractive index in the diffusant-containing region then a waveguide, similar to that shown in FIG. 4, can be formed by this embodiment of the inventive method. Also, a nonmetallic positive patterning layer, exemplified by layer 30 of FIG. 3, can be deposited onto the surface of a planar guide, e.g., an epitaxial layer on an InP substrate, with the layer having a larger refractive index than the substrate. If the appropriate metal atoms, derived from the processing atmosphere, are diffused into the uncovered surface regions of the planar guide during the heat treatment then a strip waveguide, similar to the guide shown in FIG. 2, can be formed. The above exemplary variants for the practice of the invention are not intended to be exhaustive.

The metal patterning layers are typically formed by well-known processes such as evaporation, e-beam evaporation, sputtering, electroplating, or chemical vapor deposition. Similarly, the patterning is done typically by well-known photolithographic techniques and etching. These aspects thus are familiar to those skilled in the art and need not be discussed in detail herein.

Because the phosphorus loss has to be minimized, the samples advantageously are heat treated in a relatively small enclosed volume, for instance, inside a previously evacuated ampoule. We have found that this, together with the protection provided by the patterning layer, sufficiently reduces sample surface deterioration due to loss of phosphorus from the near-surface volume during the heat treatment. The heat treatment of the samples is carried out at temperatures between about 400° C. and about 600° C., preferably between about 450° C. and about 550° C. for a time of at least 1 hour. Temperatures in the preferred range typically are high enough to result in sufficient diffusion depth with processing times of a few hours, while the temperatures within this range typically are low enough to avoid significant surface deterioration, if the above discussed precautions are taken. The metal layers are typically thin, less than 2000 Angstroms thick, as compared to strain producing layers. Layers thinner than 50 Angstroms are undesirable because they may not have enough metal to produce the desired guiding structure.

The metals useful in the practice of the invention include Si, Ge, Sn, Te, Se, As, Sb, Cd, Zn, In, Al, Fe, Cr, Cu, Ag, and Au, with Ge, Au, Fe, and Cr being preferred. Ge and Au appear to lower the refractive index of substantially undoped InP or InGaAsP, and thus can be used to form strip waveguides in planar waveguides by e.g., diffusing the metal from a negative metal patterning layer. On the other hand, Fe and Cr appear to raise the refractive index of highly doped n-type or p-type InP or InGaAsP ($|N_D-N_A|$ is typically greater than about $10^{18}$ cm$^{-3}$), and thus can be used to form strip waveguides by diffusing the metal from, e.g., a positive patterning layer. Similarly, a p-type diffusant such as Cd or Zn can be used to compensate a heavily n-type doped substrate, or a n-type diffusant such as Ge or Sn can be used to compensate a p-type substrate.

The optical device will generally further comprise means for injecting radiation, such as a laser, light emitting diode, or even a passive device into said waveguide. The optical device will generally also further comprise means for utilizing said radiation, such as a photodetector or a passive device such as a switch, modulator, etc., from said waveguide.

EXAMPLES

Undoped InP or InGaAsP layers, with thickness of about 2 μm, were grown by liquid-phase epitaxy on n-type InP substrates. The epitaxial layers typically had an excess carrier concentration $|N_D-N_A|$ of about $10^{16}$ cm$^{-3}$, and the substrate typically had excess carrier concentration of about $10^{19}$ cm$^{-3}$. The InP epitaxial layers were planar guides by virtue of their lower carrier concentration, compared with the substrate, and the InGaAsP layers, which were typically grown on undoped InP buffer layers, were planar guides by virtue of their small bandgap energy.

I. A silicon-nitride layer was deposited over the epitaxial layer, and patterned and etched by standard techniques to yield a positive nitride mask. The strips of the mask ranged in width from 8 μm to about 75 μm. Gold was electroplated to a thickness of about 0.2 μm in the windows of the mask to form a negative gold pattern. The sample was then heat treated inside an evacuated quartz ampoule for about 3 hours at about 500° C., resulting in diffusion of at least a part of the deposited gold into the underlying region of the epitaxial layer. Upon completion of the heat treatment, the silicon nitride and excess gold were removed with HF and KI, respectively. The treatment was found to have resulted in the formation of strip waveguides that guided, between the gold diffused regions, both the TE and TM modes of 1.3 μm radiation from a Nd:YAG laser substantially without difference. The attenuation of the guide typically was substantially less than 10 db/cm, and the condition of the sample surface was substantially unaffected by the heat treatment.

II. A positive photoresist mask was produced by standard techniques on the surface of an undoped 3.5 μm thick epitaxial layer of 1.15 μm-bandgap InGaAsP. The substrate was n+ InP, on which an undoped 3.5 μm thick InP buffer layer had been grown. A 0.1 μm thick Ge layer was electron-beam evaporated over the masked surface of the epitaxial layer. The photoresist and Ge overlaying it were removed with photoresist solvent leaving a negative Ge pattern. The sample was enclosed in an evacuated quartz ampoule and heat treated for about 24 hours at about 500° C. The heat treatment resulted in the formation of waveguides, which were found to guide both TE and TM modes of 1.3 μm laser radiation in the undiffused regions. The treatment resulted in an estimated index change of about $5 \times 10^{-4}$, and left the surface of the sample substantially unaffected.

III. A positive silicon-nitride mask, produced as in the above examples, was used to define waveguiding regions in an undoped InGaAsP epitaxial layer deposited on an undoped InP buffer layer on an n+ InP substrate. The sample was enclosed, together with a small quantity of ZnAs, in an evacuated quartz ampoule and maintained at a temperature of about 500° C. for about 3 hours. At this temperature, ZnAs is present in vapor form in the ampoule, and supplies zinc atoms that can diffuse into those regions of the epitaxial layer that are not covered by a masking layer to form a negative Zn pattern. Upon completion of the heat treatment the silicon-nitride mask was removed from the surface with HF. This procedure too resulted in formation of structures capable of guiding both modes of 1.3 μm laser light in the undiffused strips, with an attenuation estimated to be substantially less than 10 db/cm. The treatment did not result in substantial deterioration of the sample surface.

In a related use of the inventive treatment, regions of high resistivity can be created in low resistivity InP or InGaAsP epitaxial layers by indiffusion of metals that form deep traps in these semiconductors, e.g., Fe or Cr. In various optical devices comprising a waveguide, e.g., in waveguide modulators, it is required to apply an electrical field. At present, Schottky barriers or p-n junctions are typically used to create a depletion region in low resistivity material such as InP or InGaAsP in order to apply high electric fields. Indiffusion of Fe from a uniform or patterned Fe layer, in the same manner as described above, into a low resistivity epitaxial InP or InGaAsP, can result in the formation of high resistivity regions in the layer, and these regions can be used to apply high electric fields in the same manner as the prior art titanium diffused LiNbO$_3$ waveguides. Typically, the epitaxial layers would be grown on semi-insulating substrates.

Although our invention has been described specifically with respect to waveguides in InP and InGaAsP, it will be readily appreciated that our method may be used to form waveguides in other semiconductors. In other semiconductors, temperatures of at least 400° C. will be used to indiffuse the metal. It is also to be understood that the term InGaAsP means the composition that is lattice matched to an InP substrate or buffer layer. It will be readily appreciated by those skilled in the art that the strip waveguides may contain bends.

What is claimed is:

1. Method for manufacturing an optical device comprising an optical waveguide in a semiconductor material, the method comprising (a) depositing a patterned processing layer on a surface of said semiconductor, thereby defining the waveguiding region,
    (b) maintaining the semiconductor material carrying the processing layer at a temperature of at least 400° C. for at least about one hour, and
    (c) contacting during at least part of the time of step (b) at least a part of the semiconductor carrying the processing layer with metal atoms, where the metal is selected from the group consisting of Si, Ge, Sn, Te, Se, As, P, Sb, Cd, Zn, In, Ga, Al, Fe, Cr, Cu, Ag, and Au whereby said metal atoms diffuse into said material thereby defining an optical waveguide.

2. A method as recited in claim 1 in which said optical device further comprises means for injecting radiation into said waveguide and means for utilizing said radiation from said waveguide.

3. Method of claim 1 or 2 wherein said semiconductor consists essentially of one member selected from the group consisting of InP and InGaAsP.

4. Method of claim 3 in which said maintaining step is at a temperature between 400° C. and 600° C.

5. Method of claim 4 wherein the patterned processing layer is a metal layer, and the metal atoms of step (c) are derived from said metal layer.

6. Method of claim 5 in which said metal atoms are selected from the group consisting of Ge, Au, Fe, and Cr.

7. Method of claim 6 in which said metal layer has a thickness between 50 Angstroms and 2000 Angstroms.

8. Method of claim 1 or 2 wherein the patterned processing layer is a non-metallic layer, and the metal atoms of step (c) are derived from a processing atmosphere comprising a metal compound.

9. Method of claim 1 or 2 wherein said semiconductor material comprises a substrate consisting essentially of InP and an epitaxial layer consisting essentially of InGaAsP, with the refractive index of the epitaxial layer being greater than that of the substrate.

10. Method of claim 9 where the semiconductor material further comprises a buffer layer consisting essentially of substantially undoped InP disposed between the substrate and the epitaxial layer.

11. Method of claim 10 in which said maintaining step is at a temperature between 400° C. and 600° C.

12. Method of claim 11 wherein the waveguiding region is defined by means of a negative patterned processing layer.

13. Method of claim 12 wherein the processing layer consists essentially of Au or Ge, said layer having a thickness between 50 Angstroms and 2000 Angstroms.

14. Method of claim 11 wherein the waveguiding region is defined by means of a positive patterned processing layer.

15. Method of claim 14 wherein the processing layer consists essentially of Fe or Cr, said layer having a thickness between 50 Angstroms and 2000 Angstroms.

16. Method of claim 15 wherein the substrate has a free carrier density of at least about $10^{18}$ cm$^{-3}$.

* * * * *

UNITED STATES PATENT AND TRADEMARK OFFICE
CERTIFICATE OF CORRECTION

PATENT NO. : 4,376,138

DATED : March 8, 1983

INVENTOR(S) : Rodney C. Alferness and Ivan P. Kaminow

It is certified that error appears in the above—identified patent and that said Letters Patent is hereby corrected as shown below:

Column 2, line 2, "pplied" should read --Applied--. Column 2, line 36, "pplied" should read --Applied--. Column 6, line 41, "small" should read --smaller--. In the claims, Column 8, line 41, "where" should read --wherein--.

Signed and Sealed this

Tenth Day of May 1983

[SEAL]

Attest:

GERALD J. MOSSINGHOFF

Attesting Officer    Commissioner of Patents and Trademarks